(12) United States Patent
Eitel et al.

(10) Patent No.: US 7,059,308 B2
(45) Date of Patent: Jun. 13, 2006

(54) COOLING DEVICE

(75) Inventors: Jochen Eitel, Bissingen (DE); Daniel Hendrix, Stuttgart (DE); Wolfgang Kramer, Weinstadt (DE); Rainer Lutz, Steinheim (DE)

(73) Assignee: BEHR GmbH & Co. KG, Stuggart (DE)

( * ) Notice: Subject to any disclaimer, the term of this patent is extended or adjusted under 35 U.S.C. 154(b) by 0 days.

(21) Appl. No.: 10/517,348

(22) PCT Filed: Nov. 3, 2003

(86) PCT No.: PCT/EP03/12223

§ 371 (c)(1),
(2), (4) Date: Dec. 9, 2004

(87) PCT Pub. No.: WO2004/051069

PCT Pub. Date: Jun. 17, 2004

(65) Prior Publication Data

US 2005/0199229 A1    Sep. 15, 2005

(30) Foreign Application Priority Data

Dec. 3, 2002    (DE) ................ 102 56 611

(51) Int. Cl.
*F02B 47/08*    (2006.01)
(52) U.S. Cl. .............. 123/568.12; 123/568.15
(58) Field of Classification Search .......... 123/568.12, 123/568.15; 60/278, 274, 286, 298, 320, 60/605.2
See application file for complete search history.

(56) References Cited

U.S. PATENT DOCUMENTS

| | | | | |
|---|---|---|---|---|
| 4,179,892 A | * | 12/1979 | Heydrich | 60/605.2 |
| 5,517,976 A | | 5/1996 | Bachle et al. | |
| 5,607,010 A | * | 3/1997 | Schonfeld et al. | 165/51 |
| 5,617,726 A | | 4/1997 | Sheridan et al. | |
| 5,720,341 A | * | 2/1998 | Watanabe et al. | 165/135 |
| 5,771,868 A | * | 6/1998 | Khair | 123/568.12 |
| 5,791,146 A | * | 8/1998 | Dungner | 60/605.2 |
| 6,029,451 A | * | 2/2000 | Gartner | 60/605.2 |
| 6,244,256 B1 | * | 6/2001 | Wall et al. | 123/568.12 |
| 6,354,084 B1 | * | 3/2002 | McKinley et al. | 60/605.2 |
| 6,370,871 B1 | * | 4/2002 | Suzuki et al. | 60/286 |
| 6,422,222 B1 | * | 7/2002 | Arbeiter et al. | 123/568.2 |
| 6,427,436 B1 | | 8/2002 | Allansson et al. | |
| 6,526,752 B1 | * | 3/2003 | McKinley et al. | 60/605.2 |
| 6,574,956 B1 | * | 6/2003 | Moraal et al. | 60/295 |
| 6,594,990 B1 | * | 7/2003 | Kuenstler et al. | 60/295 |
| 6,729,133 B1 | * | 5/2004 | Sorter et al. | 60/599 |
| 6,732,522 B1 | * | 5/2004 | Wright et al. | 60/602 |
| 6,742,335 B1 | * | 6/2004 | Beck et al. | 60/605.2 |
| 6,752,132 B1 | * | 6/2004 | Remmels et al. | 123/568.11 |
| 6,789,512 B1 | * | 9/2004 | Duvinage et al. | 123/41.05 |
| 6,804,601 B1 | * | 10/2004 | Wang et al. | 701/107 |

(Continued)

FOREIGN PATENT DOCUMENTS

| | | |
|---|---|---|
| DE | 43 31 509 C1 | 7/1994 |
| DE | 198 53 455 A1 | 6/1999 |
| EP | 1 031 722 A2 | 8/2000 |
| EP | 1 091 113 A2 | 4/2001 |

*Primary Examiner*—Mahmoud Gimie
(74) *Attorney, Agent, or Firm*—Foley & Lardner LLP

(57) ABSTRACT

The invention relates to a device for cooling media or liquids, in particular the inlet air and exhaust gas from a motor vehicle.

16 Claims, 3 Drawing Sheets

U.S. PATENT DOCUMENTS

| | | | |
|---|---|---|---|
| 6,848,434 B1 * | 2/2005 | Li et al. | 123/568.12 |
| 6,886,336 B1 * | 5/2005 | Super et al. | 60/605.2 |
| 6,899,090 B1 * | 5/2005 | Arnold | 123/568.12 |
| 6,917,873 B1 * | 7/2005 | Itoyama | 701/108 |
| 2001/0045090 A1 | 11/2001 | Gray, Jr. | |
| 2002/0026926 A1 | 3/2002 | Loye et al. | |

* cited by examiner

COOLING DEVICE

BACKGROUND

The invention relates to an apparatus for cooling media or fluids, in particular charge air and recirculated exhaust gases in exhaust-gas recirculation systems, in particular for a motor vehicle or for large engines.

According to the prior art, turbochargers or other mechanical supercharging systems, such as compressors or the like, are used to increase the power of engines by compressing the air which is to be fed for combustion or the charge air. The fluid, gas or medium, such as in particular air, which is in the process heated as a result of the compression operation, is then generally cooled by a charge-air cooler. This is done also in order to further increase the air density and to limit the combustion peak temperatures. The charge air flows through a heat exchanger, which, by way of example, has ambient air or a cooling medium flowing through it and is thereby cooled. This allows the charge air to be cooled to a temperature which is approximately 20–90 K above the temperature of the ambient air or is as close as possible to this temperature.

In apparatuses with exhaust-gas recirculation, the exhaust gas is cooled in a dedicated heat exchanger and is then admixed or fed to the cooled charge air. This typically results in the temperature of the exhaust-gas/charge-air mixture being higher than the charge-air temperature at the outlet of the charge-air cooler.

This results in a significant drawback with regard to demands relating to reduced emissions, in particular of NOx, and reduced consumption, which are certain to rise in future.

SUMMARY

It is an object of the invention to provide an apparatus in which the temperature of the exhaust-gas/charge-air mixture is reduced compared to known apparatuses.

According to the invention, this object is achieved by an apparatus for cooling charge air and exhaust gas in particular in a motor vehicle or for large engines with internal combustion engine, having a recirculated exhaust-gas stream and a charge-air stream, in which the exhaust-gas stream is cooled by means of a first and a second heat exchanger, the charge-air stream is cooled by means of a third heat exchanger, before the exhaust-gas stream and charge-air stream which have been cooled in this manner are combined and mixed.

According to a further concept of the invention, the object of the invention is achieved by an apparatus for cooling charge air and exhaust gas in particular in a motor vehicle with internal combustion engine, having a recirculated exhaust-gas stream and a charge-air stream, in which the exhaust-gas stream is cooled by means of a first heat exchanger, the cooled exhaust-gas stream is combined with the charge-air stream, and the mixed exhaust-gas/charge-air stream is then cooled by means of a second heat exchanger.

According to a further concept of the invention, the object of the invention is achieved by an apparatus for cooling charge air and exhaust gas in particular in a motor vehicle with internal combustion engine, having a recirculated exhaust-gas stream and a charge-air stream, in which the exhaust-gas stream is combined with the charge-air stream and the mixed exhaust-gas/charge-air stream is then cooled by means of a heat exchanger.

In this context, it is advantageous if the recirculated exhaust-gas stream can be controlled by means of a valve. A valve of this type may preferably be a disk valve. However, a different type of valve can also be used in other exemplary embodiments of the invention.

Furthermore, it may be expedient if the first heat exchanger and the second heat exchanger are formed as separate heat exchangers. In a further exemplary embodiment, it is expedient if the first heat exchanger and the second heat exchanger, as separate heat exchangers, are formed as a structural unit. Furthermore, in a further exemplary embodiment it is expedient if the first and/or the second and/or the third heat exchanger are formed as a structural unit.

According to the invention, it is expedient if at least one of the heat exchangers is cooled by means of a first coolant, such as air, coolant, such as cooling water with or without additives, refrigerant from a refrigerant circuit in particular of an air-conditioning system.

BRIEF DESCRIPTION OF THE DETAILS

In the text which follows, the invention is explained in detail on the basis of a number of exemplary embodiments and with reference to the drawing, in which.

DETAILED DESCRIPTION

Figure 1:
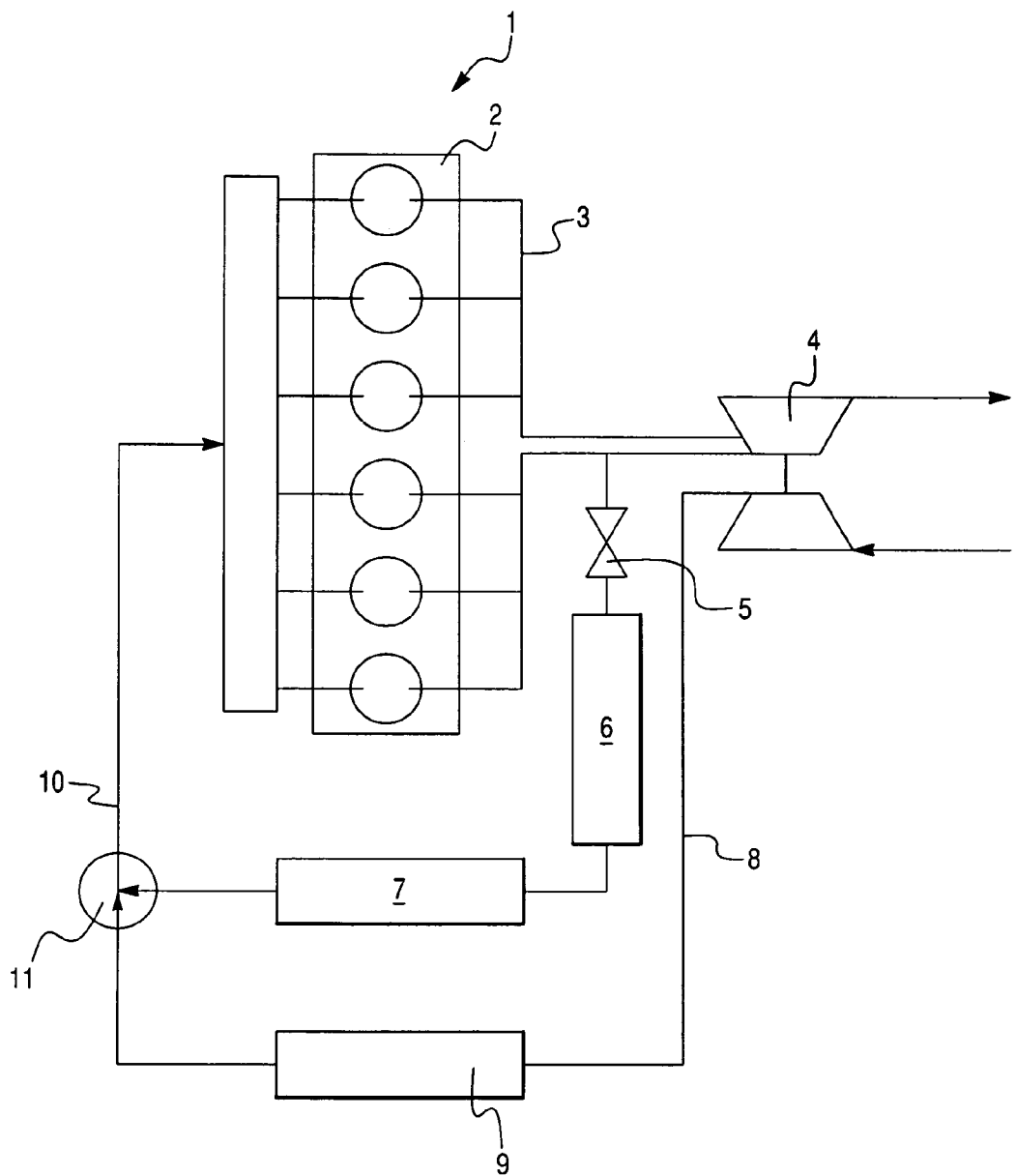
FIG. 1 shows an apparatus in accordance with a first exemplary embodiment of the invention.

FIG. 1 shows an apparatus 1 for cooling fluids, such as in particular for cooling exhaust gas and charge air. The exhaust gas from the internal combustion engine 2 is discharged through the pipes 3 and, for example, passed via a turbine 4. Part of the exhaust-gas stream is recirculated via a valve 5. The recirculated exhaust gas is cooled by a first heat exchanger 6. At the outlet, it reaches a first temperature T1. Then, the exhaust gas which has been cooled to T1 is cooled to temperature T2 by a second heat exchanger.

The charge air is compressed by means of the element 4. The compressed charge air is fed by means of the pipes 8 to a third heat exchanger 9, which cools the charge air to a temperature T3. After it has emerged from the third heat exchanger, the cooled charge air is mixed with the exhaust gas, which has been cooled twice, and fed back to the engine 2 by means of the pipe 10.

It is advantageous if the exhaust gas in the first heat exchanger is cooled by means of engine cooling water as cooling medium. The second heat exchanger 7 can then use air, a low-temperature coolant or a refrigerant as cooling medium in order to further cool the exhaust gas. The low-temperature coolant is in this case a coolant at a temperature which is lower than the temperature of the engine cooling water used in the first heat exchanger.

The two heat exchangers 6 and 7 may in this case be formed as separately formed heat exchangers or may be formed as a structural unit. It is also possible for one of the two heat exchangers 6 or 7 or both of these heat exchangers to be formed as a structural unit with the third heat exchanger 9. However, the latter may also be formed as a separate heat exchanger.

In the case of heat exchangers which have been combined as a structural unit, the fluid passages for exhaust gas and charge air are routed and cooled separately.

It is preferable for the heat exchanger 7 to be fixed to the engine or arranged or integrated in a cooling module, in which various coolers, radiators or heat exchangers are combined.

It is preferable for charge air and exhaust gas to be mixed in a mixing chamber 11, which can also be cooled. For this purpose, the mixing chamber may be part of a module or a heat exchanger.

Figure 2:
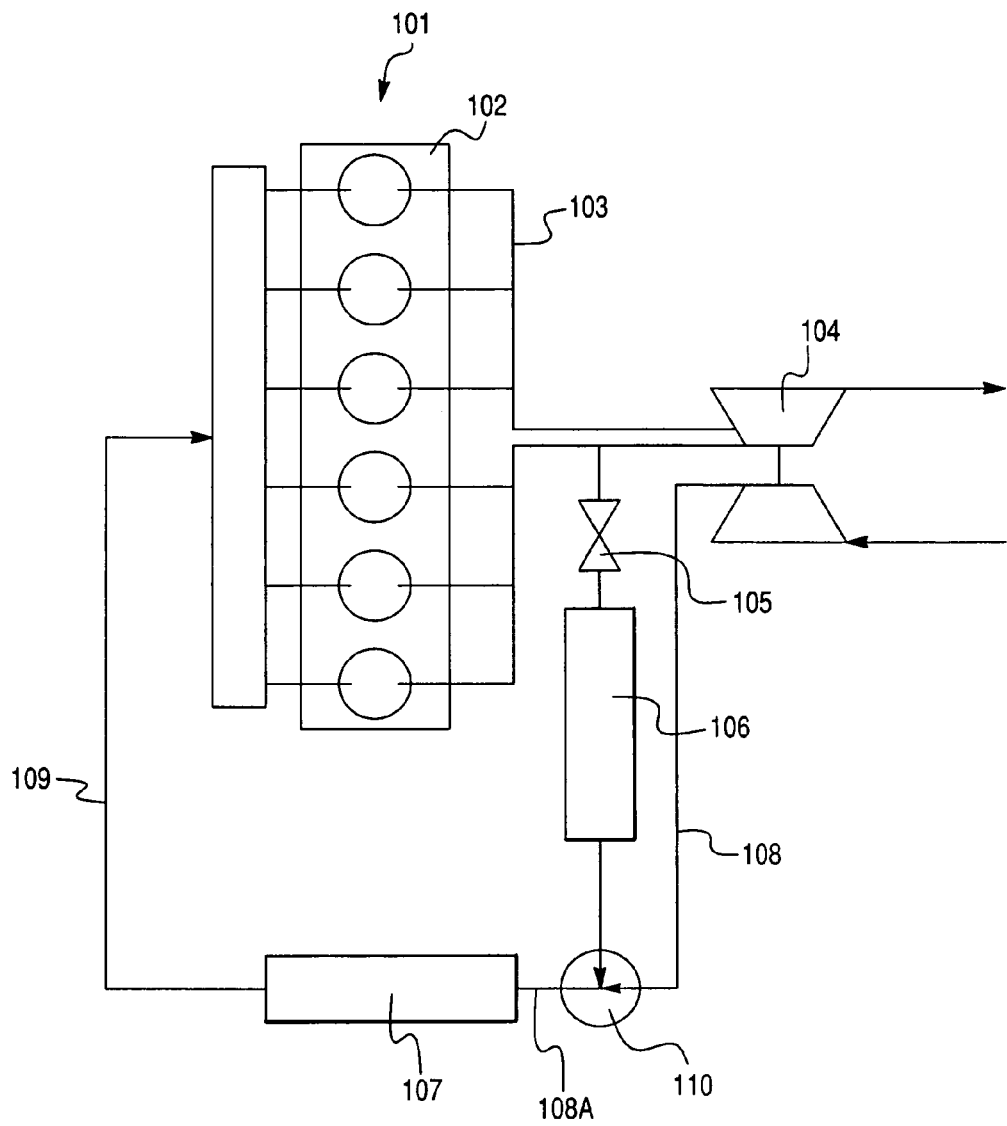
FIG. 2 shows an apparatus in accordance with a second exemplary embodiment of the invention.

FIG. 2 shows an apparatus 101 for cooling fluids, such as in particular for cooling exhaust gas and charge air. The exhaust gas from the internal combustion engine 102 is discharged through the pipes 103 and, for example, passed across a turbine 104 or the like. Some of the exhaust-gas stream is recirculated to the engine 102 via a valve 105. The recirculated exhaust gas is cooled by a first heat exchanger 106. It reaches a first temperature T1 at the outlet. Then, the exhaust gas which has been cooled to T1 is mixed with the compressed charge air from line 108.

The charge air which has been mixed with exhaust gas is fed, by means of the pipes 108a, to a second heat exchanger 107, which cools the exhaust gas/charge air mixture to a temperature T2. After it emerges from the second heat exchanger 107, the cooled exhaust gas/charge air mixture is fed back to the engine 102 by means of the pipe 109.

It is advantageous if the exhaust gas in the first heat exchanger 106 is cooled by means of engine cooling water as cooling medium. The second heat exchanger 107 can then use engine cooling water, air, a low-temperature coolant or a refrigerant as cooling medium for further cooling of the exhaust gas/charge air mixture. The low-temperature coolant is in this case a coolant which is at a temperature that is lower than the temperature of the engine cooling water used in the first heat exchanger.

The two heat exchangers 106 and 107 may be formed as separately formed heat exchangers or may be formed as a structural unit. If they are formed as a structural unit, the coolers, radiators or heat exchangers can be formed in such a manner that the media, in particular exhaust gas and charge air, are routed in different fluid passages.

It is preferable for charge air and exhaust gas to be mixed in a mixing chamber 110, which may also be cooled. For this purpose, the mixing chamber may be part of a module or of a heat exchanger.

It is preferable for the heat exchanger 106 and/or 107 to be arranged fixed to the engine or arranged or integrated in a cooling module in which various coolers, radiators or heat exchangers are combined.

Figure 3:
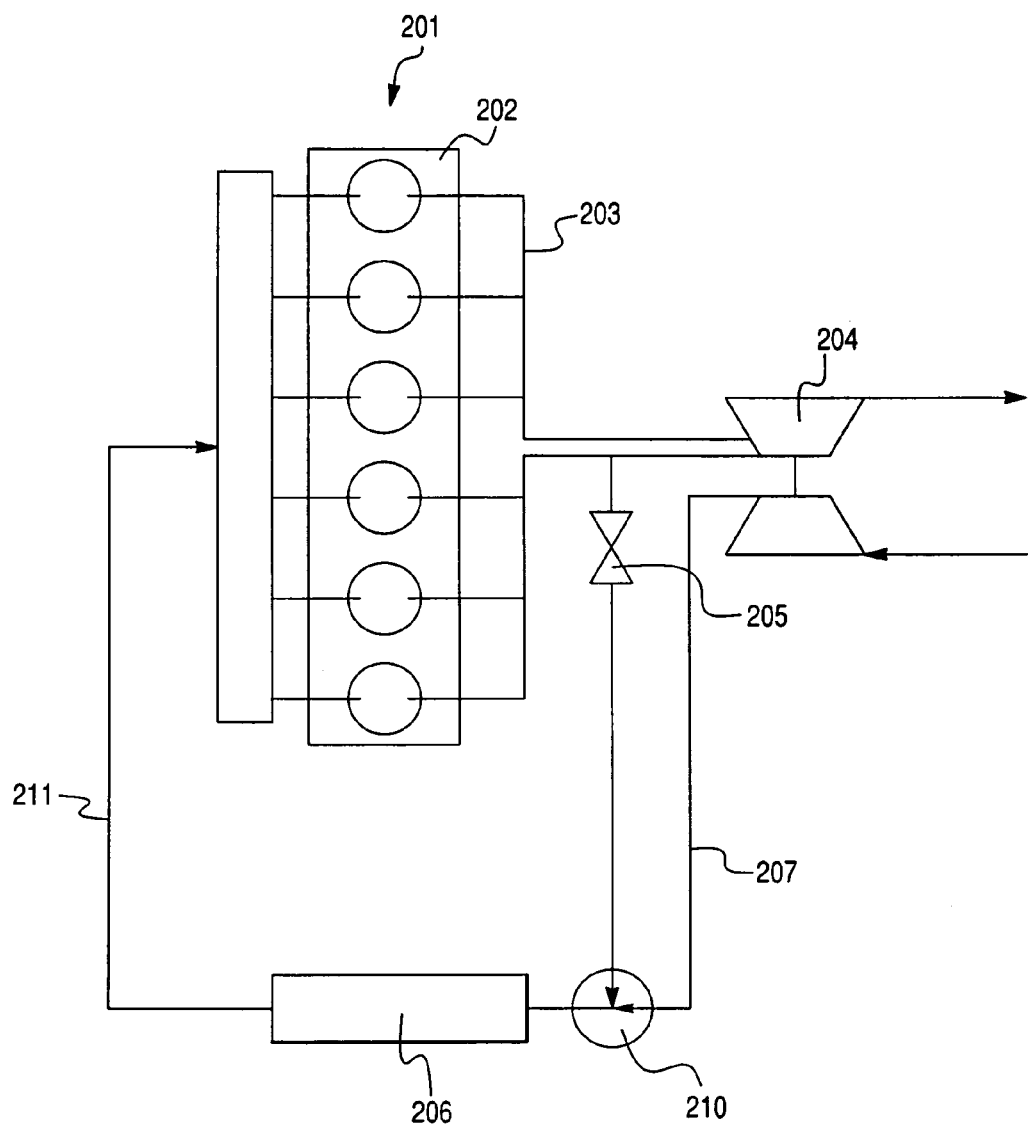
FIG. 3 shows an apparatus in accordance with a third exemplary embodiment of the invention.

FIG. 3 shows an apparatus 201 for cooling fluids, such as in particular for cooling exhaust gas and charge air. The exhaust gas from the internal combustion engine 202 is discharged through the pipes 203 and passed, for example across a turbine 204. Some of the exhaust-gas stream is recirculated to the engine 202 via a valve 205. The recirculated exhaust gas is mixed with the compressed charge air from pipe 207 upstream of the heat exchanger 206.

The charge air is compressed by means of the element 204. The compressed charge air is fed, by means of the pipes 207, to a mixing chamber 210, in which the charge air and the recirculated exhaust gas are mixed. The mixing chamber 210 may advantageously be cooled. For this purpose, the mixing chamber may be part of a module or a heat exchanger.

The mixed exhaust gas/charge air mixture is cooled to temperature T by means of the heat exchanger 206.

After it has emerged from the heat exchanger 206, the cooled exhaust gas/charge air mixture is fed back to the engine 202 by means of the pipe 211.

It is advantageous if the first heat exchanger is operated and supplied by means of engine cooling water, air, a low-temperature coolant or a refrigerant in order to cool the exhaust gas/charge air mixture. The low-temperature coolant is in this case a coolant which is at a temperature that is lower than the temperature of the engine cooling water used in the first heat exchanger. It is also possible for a plurality of the abovementioned coolants to be used in one heat exchanger in order to cool the temperature T of the exhaust gas/charge air mixture as far as possible. For this purpose, separate circuits are provided for the coolants in the heat exchanger.

It is preferable for the heat exchanger 206 to be arranged fixed to the engine or to be arranged or integrated in a cooling module in which various coolers, radiators or heat exchangers are combined.

In the exemplary embodiments described, the exhaust gas is recirculated upstream of the turbine, i.e. the exhaust gas is tapped off upstream of the turbine and partially recirculated. In corresponding exemplary embodiments, it is also possible for the exhaust gas to be tapped off from the low-pressure side of the turbine and recirculated.

In exemplary embodiments in which they flow separately through the heat exchangers, the exhaust gas and the charge air may preferably be mixed downstream of the heat exchanger.

If the exhaust gas and charge air flow through one heat exchanger, they can be mixed before entering the heat exchanger or in the inlet chamber thereof. It is also possible for the mixing to take place at the end of the heat exchanger, in its end chamber, or outside the heat exchanger.

The invention is not restricted only to the exemplary embodiments mentioned above. It is also possible for individual features of the exemplary embodiments to be combined with one another.

The invention claimed is:

1. An apparatus suitable for cooling charge air and exhaust gas in a motor vehicle with an internal combustion engine, comprising:
   a first heat exchanger adapted to cool a recirculated exhaust-gas stream;
   a second heat exchanger adapted to cool the exhaust-gas stream, said second heat exchanger located downstream from the first heat exchanger; and
   a third heat exchanger adapted to cool a charge-air stream,
   wherein the apparatus is adapted to combine the exhaust-gas stream and charge-air stream after the exhaust-gas stream has been cooled by the first heat exchanger and the second heat exchanger and after the charge-air stream has been cooled by the third heat exchanger, and
   wherein the first heat exchanger and the second heat exchanger are separate heat exchangers and are formed as a structural unit.

2. The apparatus as claimed in claim 1, further comprising a valve adapted to control the recirculated exhaust-gas stream.

3. The apparatus as claimed in claim 1, further comprising fluid passages that separately route and cool the exhaust gas and the charge air.

4. The apparatus as claimed in claim 1, further comprising a mixing chamber that is adapted to combine the exhaust-gas stream and charge-air stream after the exhaust-gas stream has been cooled by the first heat exchanger and the second heat exchanger and after the charge-air stream has been cooled by the third heat exchanger,
   wherein the mixing chamber comprises a portion of a heat exchanger and is adapted to be cooled.

5. The apparatus as claimed in claim 1, further comprising a mixing chamber that is adapted to combine the exhaust-gas stream and charge-air stream after the exhaust-gas stream has been cooled by the first heat exchanger and the second heat exchanger and after the charge-air stream has been cooled by the third heat exchanger, wherein the mixing chamber is part of a heat exchange module.

6. The apparatus as claimed in claim 1, further comprising a mixing chamber that is adapted to combine the exhaust-gas stream and charge-air stream after the exhaust-gas stream has been cooled by the first heat exchanger and the second heat exchanger and after the charge-air stream has been cooled by the third heat exchanger, wherein the mixing chamber is part of a heat exchanger.

7. The apparatus as claimed in claim 6, wherein the exhaust-gas stream and the charge-air stream are mixed at an inlet of the heat exchanger.

8. The apparatus as claimed in claim 6, wherein the exhaust-gas stream and the charge-air stream are mixed at an exit end of the heat exchanger.

9. An apparatus suitable for cooling charge air and exhaust gas in a motor vehicle with an internal combustion engine, comprising:
a first heat exchanger adapted to cool a recirculated exhaust-gas stream;
a second heat exchanger adapted to cool the exhaust-gas stream; and
a third heat exchanger adapted to cool a charge-air stream,
wherein the apparatus is adapted to combine the exhaust-gas stream and charge-air stream after the exhaust-gas stream has been cooled by the first heat exchanger and the second heat exchanger and after the charge-air stream has been cooled by the third heat exchanger, and
wherein at least two of the first and/or the second and/or the third heat exchanger are formed as a structural unit.

10. The apparatus as claimed in claim 9, further comprising a mixing chamber that is adapted to combine the exhaust-gas stream and charge-air stream after the exhaust-gas stream has been cooled by the first heat exchanger and the second heat exchanger and after the charge-air stream has been cooled by the third heat exchanger,
wherein the mixing chamber comprises a portion of a heat exchanger and is adapted to be cooled.

11. An apparatus suitable for cooling charge air and exhaust gas in a motor vehicle with an internal combustion engine, comprising:
a first heat exchanger adapted to cool a recirculated exhaust-gas stream; and
a second heat exchanger adapted to cool a mixed exhaust-gas/charge-air stream that is formed by combining the exhaust-gas stream cooled by the first heat exchanger with a charge-air stream,
wherein the first heat exchanger and the second heat exchanger are separate heat exchangers and are formed as a structural unit.

12. The apparatus as claimed in claim 11, wherein the first heat exchanger and/or the second heat exchanger is fixed to the engine.

13. The apparatus as claimed in claim 11, wherein the first heat exchanger and/or the second heat exchanger is integrated in a cooling module.

14. The apparatus as claimed in claim 11, further comprising a mixing chamber that is adapted to form the mixed exhaust-gas/charge-air stream by combining the exhaust-gas stream cooled by the first heat exchanger with the charge-air stream,
wherein the mixing chamber comprises a portion of a heat exchanger and is adapted to be cooled.

15. An apparatus suitable for cooling charge air and exhaust gas in a motor vehicle with an internal combustion engine, comprising:
a first heat exchanger adapted to cool a recirculated exhaust-gas stream; and
a second heat exchanger adapted to cool a mixed exhaust-gas/charge-air stream that is formed by combining the exhaust-gas stream cooled by the first heat exchanger with a charge-air stream,
wherein the exhaust gas is recirculated upstream of a turbine.

16. The apparatus as claimed in claim 15, further comprising a mixing chamber that is adapted to form the mixed exhaust-gas/charge-air stream by combining the exhaust-gas stream cooled by the first heat exchanger with the charge-air stream,
wherein the mixing chamber comprises a portion of a heat exchanger and is adapted to be cooled.

* * * * *